United States Patent [19]

Winrow et al.

[11] 3,953,274

[45] Apr. 27, 1976

[54] MAGNETICALLY ACTUABLE ELEMENT AND METHOD OF MAKING

[75] Inventors: Donald Winrow, Weston; Charles Norman Smith, Mississauga, both of Canada

[73] Assignee: Ferranti-Packard Limited, Toronto, Canada

[22] Filed: Dec. 23, 1974

[21] Appl. No.: 536,925

[52] U.S. Cl. .............................. 156/252; 156/303.1; 156/324

[51] Int. Cl.[2] ...................... B32B 31/00; B65C 9/25

[58] Field of Search ........... 156/252, 253, 293, 324, 156/513, 514, 554, 303.1

[56] References Cited

UNITED STATES PATENTS

| | | | |
|---|---|---|---|
| 2,674,009 | 4/1954 | Williams | 156/252 |
| 2,688,582 | 9/1954 | Phair et al. | 156/252 |

*Primary Examiner*—Douglas J. Drummond

[57] ABSTRACT

A middle tape punched to receive magnets is provided first with a tape on one side then with magnets in the punched apertures and then with a tape on the other side to provide a source of a series of magnetically actuable elements.

7 Claims, 7 Drawing Figures

12
14
16
10

18
18
20

22

24

10
20

MAGNETICALLY ACTUABLE ELEMENT AND METHOD OF MAKING

This invention relates to magnetically operable elements and to their methods of construction. Such elements are designed to be of contrasting appearance or to be contrastingly coloured on opposite sides and are rotatable between two limiting positions each displaying one of the contrasting sides to a viewer.

Such elements are used in magnetically actuable signs, displays or indicators and devices incorporating such elements, and are shown in the following United States patents belonging to the applicant herein:

U.S. Pat. No. 3,365,824 issued Jan. 30, 1968
U.S. Pat. No. 3,140,553 issued July 14, 1964
U.S. Pat. No. 3,518,664 issued June 30, 1970
U.S. Pat. No. 3,469,258 issued Sept. 23, 1969
U.S. Pat. No. 3,624,941 issued Dec. 7, 1971

Although the elements shown in these patents and used in the devices there shown, have been satisfactory when such devices were custom-built, previous methods of making the device were not satisfactory nor sufficiently economical for mass production.

There has now been devised a method of making such elements; (and a product from which such elements can be made) in quantity, easily and with economy. The result of the inventive method is such a magnetically actuable element, of noval structure.

The method includes the provision of three tapes, which are to be laminated together to form the element. The middle tape will be of a width, at least equal to the diameter, or the smallest dimension of the magnetically actuable element to be constructed therefrom. Apertures corresponding to each element to be made from the tape, are provided in such middle tape, spaced longitudinally therealong dimensioned to receive a magnet therein. The magnet material for the magnets will be selected to be magnetizable in a direction having a component in the plane of the tape and with a component perpendicular to the intended direction of the element pivotal axis. Towards or at one of the edges of the middle tape, cut-outs are made to assist, in case of the use of automated machinery, the insertion of the magnet in the magnet apertures, and, whether automated machinery is used or not, to indicate at a time when the magnets are covered, the proper location of the element out-line, to assist in the cutting out, the stamping out or the weakening of a line around the element, while ensuring the proper location of a magnet in each one.

The middle tape, so apertured and cut-out is then underlaid with a lower tape which with each aperture will form the bottom of a recess for the magnet, with the recess sides defined by the aperture edges. The lower tape is caused to adhere to the middle tape and this is preferably achieved by selecting a lower tape coated on the adherence side, with a contact adhesive. The use of tape coated with contact adhesive also solves the problem of adherence of the magnet, since the tape adhesive is exposed in the bottom of the recess when the magnet is applied and acts to retain the magnet in position. The lower tape is set back from the edge to expose at least a portion of the cut-outs and preferably set back from both edges to the extent of the spindle desired.

With the lower tape so applied, the magnets are placed in position, using the cut-outs to sense the proper location if automatic machinery is used for magnet insertion.

With the magnets in place, an upper tape is placed over the exposed side of the middle tape and of the magnets and caused to adhere to the middle tape.

This adherence is preferably caused by selecting an upper tape coated on one side with contact adhesive. The upper tape will be set back from the relevant edge of the middle tape to leave exposed at least a portion of the cut-out still exposed after the application of the lower tape. In the preferred method of providing the element spindle, the upper tape will be set back from both edges to at least the length of the spindles desired.

The appearance of the element is though to be best when the thickness of the magnet is substantially the same as that of the middle tape. As long as the magnet approximates the same thickness, however, the method will provide a workable element tending toward a convexity and concavity, respectively, in the surface of an exterior tape, when the magnet is thicker or thinner than the middle tape.

With the outer tapes in place over the middle tape and the magnets, the laminated product may simply be cut by standard stamping or cutting machinery into a plurality of rotatable magnetically actuable elements, each one containing a magnet.

In cutting the three-layer laminated tape the cut-outs in their predetermined relationship to the magnets are used as a manual or automatic guide for the application of a cutting tool to cut out or weaken along a line of the required shape (usually circular) for the element. If it is desired to provide the spindles on which the element will rotate from the tape, these are stamped out of the material of the middle tape itself in an orientation to project beyond the upper and lower tapes. The magnet was selected to be magnetizable with a component perpendicular to the spindle and is preferably magnetizable in a substantially perpendicular direction.

If it is desired to have the elements separate at this stage, they are then stamped out of the laminated product. If it is desired to retain them in the tape, then the shapes are provided with weakened or scored boundaries, for detachment later.

In some cases it will be desirable to magnetize the magnets in the desired direction during their arrangement in the tape or after their detachment therefrom. Both alternatives are available with the process of the invention.

The element in use will be provided with visually contrasting surfaces on opposite faces. Usually this will be achieved by providing upper and lower tapes having opposite colors on their exposed faces.

In drawings which illustrate a preferred embodiment of the invention:

Figures 1, 2, 3, 4, 5, 6, 7:
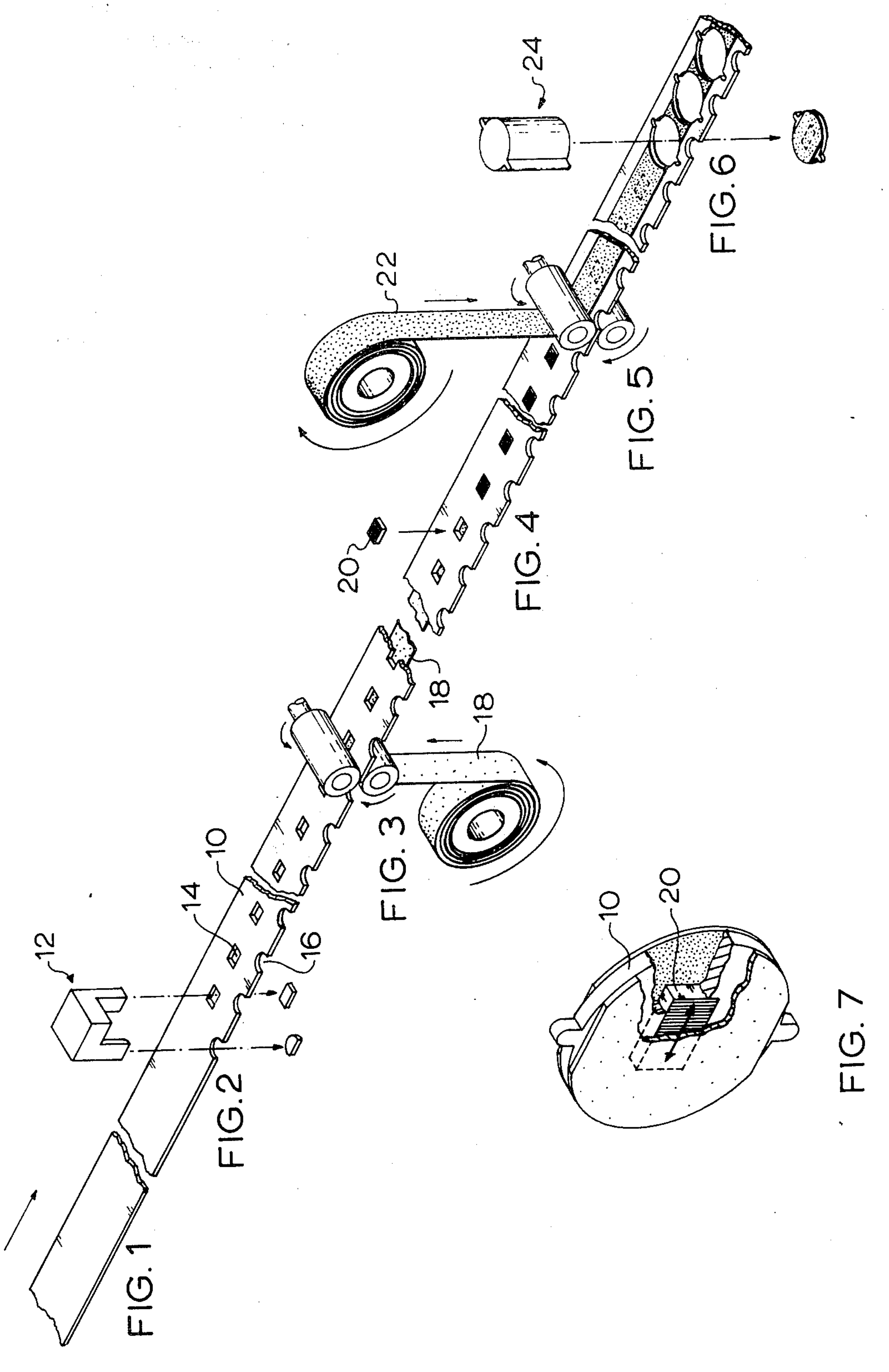
FIGS. 1–6 show sequentially the construction of elements in accord with the method of the invention.
FIG. 7 shows an element in accord with the invention.

In the drawings is shown the middle tape 10 preferably of plastic and preferably of the material sold under the trade mark "Mylar". The middle tape thickness will be selected to correspond as closely as is practical to the thickness of the magnetic material selected for the magnet. The thickness of middle tape 10 must also be selected to be sufficiently thick to sustain the planar shape of the element with the two outer tapes, and if, as preferred, the pivots are formed in the middle tape material, the thickness of the tape must be sufficient to allow the spindle to support the element weight. On the other hand, if, as is common practice, the element is to be flexed to allow the insertion of the pivot in its bearings, the Mylar tape must be made sufficiently flexible to allow this.

The surface of mylar tape 10 is preferably etched or otherwise roughened in accord with well known techniques to more readily attach to the adhesive, preferably of the pressure-sensitive type, of the two outer tape layers.

As indicated in FIG. 7 the middle mylar tape 10 will, in the preferred embodiment, be used to provide elements whose spindles are perpendicular to the longitudinal direction of the tape, and hence the magnetic axis will be parallel to the longitudinal direction of the tape and it is proposed to use magnetic material magnetizable in such longitudinal direction. Accordingly, as shown, the middle tape 10 will be stamped by any suitable well known machinery indicated schematically at 12 to provide, corresponding to each element, a rectangular magnet aperture 14 and a cut-out 16 in the edge of the tape corresponding thereto. It will be noted that there need not be a one-to-one correspondence between the cut-outs 16 and the magnetic apertures 14 but this is obviously the most convenient method since the relationship between these members must be predetermined. The relationship must be predetermined as to angle and distance to allow the element containing the magnet to be defined relative to the cut-out 16 so that an element containing the magnet 20 may be delineated by a cutting or a scoring tool after the magnet has been covered. The cut-outs 16 instead of being removed at the edge of the tape may be apertures in the tape but it is noted that while the magnet apertures 14 must be inside the area to be covered by the outer tapes, the cut-outs 16 must be outside this area to allow their use after the tape has been applied.

As shown, after the cutting of the magnet apertures 14 and cut-outs 16 the magnet tape, the lower tape 18 is applied to the underside of the mylar. This tape may be of any desired substance, usually paper or plastic tape, preferably carrying one of the contrasting colors on the side of tape 18 which is to be exposed, and pressure sensitive adhesive on the other. The tape 18 is applied preferably to a width just narrower than the diameter of the element if it is round and to almost the minimum planar dimension of the element if it is otherwise shaped. The lower tape 18 must be set back from the edges to leave unobscured at least a portion of the cut-outs, although covering the aperture. It is preferred to use the material of the middle tape to provide the spindles, rather than to provide the spindles separately. Integrally extending spindles will preferably extend from the element perpendicular to the tape extension direction and the set back of the lower tape (and of the upper) from the edges of the middle tape must be sufficient to allow for the length of the middle spindles.

With the lower tape 18 in place, adhering to middle tape 10, a magnet 20 is inserted in each aperture 14 and adheres to the exposed adhesive of tape 18. These magnets may be inserted manually or by automatic machinery using the cut-outs as sensor datums for correctly positioning the magnet in the aperture. In accord with well known techniques for operation of a device of the type described in the patents previously referred to, the magnets 20 will be of material permanently magnetizable in a predetermined direction. It is optional, and dependent on the character of the assembly and manufacturing processes whether the magnetic element is magnetized in a predetermined direction' before, during or after the manufacturing process.

With the magnets located in place, the upper tape 22 is applied on the exposed surface of the middle tape 10 and the criteria for the set-back of the upper tape from the edge with regard to leaving exposed the cut-outs 16 (or at least a portion thereof) and with regard to providing a set-back to allow for the spindle length to apply equally to the upper as to the lower tape. The upper tape will also preferably be caused to adhere by provision thereon of a contact adhesive coating. The terms 'upper' and 'lower' tape in this application and claims are, of course, used for convenience and either outer tape may be applied from or rest on the top, the bottom, the side or any other orientation.

With the tape layers in place it may be desirable in some production processes to magnetize the magnets in the desired direction at this stage and in some processes to magnetize earlier or later. It will be appreciated that if it is desired to magnetize at this stage then the tape may be simply stepped past magnetizing probes which are located by means of the cut-outs, or the magnetizing process may be performed manually. In accord with the preferred embodiment of the invention, the contrasting visual appearance of the upper side of the element will be provided by coloring the upper tape on its outer surface a contrasting color to the exposed surface of the lower tape.

The elements may be punched out or outlined mechanically by any desired stamping machinery indicated schematically at 24 located manually or automatically by the location of the cut-outs. As shown, the stamping machinery will, in the preferred embodiment, delineate a circular disc with spindles. The spindle 24 dimensions measured longitudinally of the tape will be selected to be substantially the same as the tape thickness. As stated previously, if it is desired to have the elements separate at this time, these will be simply punched out of the tape by well known techniques as indicated. On the other hand, if it is desired to retain the elements in an ordered arrangement at this time, the outline of the element will be merely scored or weakened for easy removal of the element later. As shown, there is thus provided a large plurality of magnetically actuable elements whose number is only determined by the length of the tape. These magnetically actuable elements have contrasting colors carrying a magnet having an axis of magnetization at an angle to and preferably perpendicular to the pivot (i.e. spindle) axis and spindles, for locating the element in a bearing. In this connection it will be noted that the nature of the process provides spindles of approximately square or rectangular cross-section with the side of the square of rectangle corresponding exactly and/or approximately to the thickness of the middle tape 10. It is however, found that with the use of plastic such square pivots are satisfactory in a round aperture.

Although it is within the scope of the invention to have the outer tapes cover the pivots this is not considered a preferable mode of construction because either the upper or lower tapes on the spindle may tend to interfere with the stamping of the pivots and with the operation of the element. Although it is within the scope of the invention to provide the disc element without the spindles in the method defined, and to attach the spindle as a separate element either outside the tape or between one of the tapes of the middle layer, it is found that the process of obtaining the spindles from the mylar itself or other middle tape is simpler or more economical.

The middle tape as well as the outer tapes may be made of other materials than the plastic preferred for the middle tape and the plastic or paper preferred for the outer tape. Included is possible alternatives to plastic and paper are aluminum, berylium - copper or any non-magnetic element sufficiently rigid to sustain the shape of the element and sufficiently flexible to be assembled as a tape. If the spindles are stamped out of the tape material, as preferred, then for most element mounting arrangements, the material must be sufficiently flexible that it may be flexed while the spindles are inserted in the bearing apertures and may regain its shape thereafter.

I claim:

1. In the method of constructing a plurality of laminar magnet-bearing elements, the steps of:

providing a middle tape approximately the desired thickness, in one dimension, of said element, creating a plurality of magnet apertures in said tape, longitudinally spaced, along said tape, each of said apertures being located more than a predetermined distance from at least one edge of said tape, creating cut-outs in said tape within said predetermined distance from said at least one edge in a predetermined orientation and spacing from said magnet apertures, after the creation of such apertures and cut-outs, causing first outer tape to adhere to one side of said middle tape, covering said apertures on said one side but leaving exposed at least a portion of said cut-outs, thereafter placing magnets in said apertures, each in an orientation to have its magnetic axis in a predetermined orientation relative to the longitudinal extension direction of said tapes, said megnets being selected to have an axis of magnetization with a component in the plane of the tape and a thickness approximately that of the middle tape, thereafter, causing second outer tape to adhere to the other side of said middle tape, overlying said magnets and magnet aperture and leaving exposed on said other side, at least a portion of said cut-outs.

2. In the method as claimed in claim 1, mechanically defining the border for a rotary magnetic element corresponding to each magnet.

3. A method as claimed in claim 1 wherein the exposed surface of the first outside tape contrasts visually with the exposed surface of the second outside tape.

4. A method as claimed in claim 2 wherein the weakened border defines spindle forming members defining a spindle axis at an angle to the magnetic axis.

5. A method as claimed in claim 4 wherein said spindle forming members extend onto those portions of the middle tape which are left exposed by both said outer tapes.

6. A method as claimed in claim 1 wherein said first outer tape is provided with pressure sensitive adhesive to cause adherence to the middle tape and wherein said magnet adheres to said pressure sensitive adhesive.

7. A method as claimed in claim 2 wherein said first outer tape is provided with pressure sensitive adhesive to cause adherence to the middle tape and wherein said magnet adheres to said pressure sensitive adhesive.

* * * * *